United States Patent Office 2,989,481
Patented June 20, 1961

2,989,481
PLASTIC TITANATE PIEZOELECTRIC COMPOSITION
Walter S. Miller, Elmont, N.Y., assignor to American Bosch Arma Corporation, a corporation of New York
No Drawing. Filed Nov. 4, 1958, Ser. No. 771,722
10 Claims. (Cl. 252—62.9)

This invention relates to an improved method of making polycrystalline titanates of the type which exhibit useful piezoelectric and other electrical properties.

It is well-known to use titanates such as barium titanate, strontium titanate, lead titanate, and other titanates or mixtures of said titanates to form polycrystalline masses possessing piezoelectric, ferroelectric, and other unusual electrical properties. However, up to this time, such compositions after mixing have of necessity been fired at high temperatures to form ceramic structures. Conventionally, usage of these compositions for piezoelectric functions subsequently required polarization of the ceramic body by subjecting the ceramic to an intense electric field before useful electrical properties were obtained. For instance, a ceramic material obtained by firing barium titanate mixed with additional agents such as clay or bentonite to a high temperature, within the range of 2200°–2500° F., was permanently polarized to exhibit a permanent electromechanical activity in a manner described in the Gray Patent No. 2,486,560, or simply by the application of a high unidirectional voltage at room temperature. Preferably this D.C. voltage was of the order of 25,000 volts per centimeter and was maintained for a sufficient time to induce a permanent orientation effect on the crystal structure so as to exhibit electro-mechanical transducing properties. The necessity for polarization subsequent to firing is apparently required due to the peculiar crystal structure of the titanate crystal subsequent to firing.

The above mentioned Gray patent discusses the crystalline structure development during the cooling stages subsequent to firing. One property of the titanate materials was that at a particular temperature called the "Curie point" there was a definite transformation of the crystal structure from the cubic to the tetragonal. Once polarized, ceramics of these materials have remnant piezoelectric properties, but as indicated in the prior art, only when maintained in the tetragonal or other crystalline state below the "Curie point."

The "Curie point" for barium titanate is given in the literature as about 120° C. Attempts have been made with additives to vary the "Curie point" of fired barium titanate and related compositions to raise this transformation above the temperature range of normal usage. This has been accomplished, for example, in the patent to Goodman, 2,731,419, by the use of ceramic lead metaniobate. Very little is known of the "Curie point" of unfired titanate compositions such as barium titanate but calculations made with the novel compositions of the present invention indicate that the "Curie point" or primary transformation point is elevated to about 500° C.

Also in recent years, a large amount of work has gone into research of the polycrystalline titanate, to locate various additives or addition agents to improve the transducing, ferroelectric and or dielectric characteristics of the ceramic. But in most instances, the additive has been used to enhance the properties of the ceramic, or to facilitate polarization, and while these ceramic titanates have found many uses, they have thus been limited by the fact that they are ceramic in structure, and also by the fact that they have required polarization prior to obtaining useful piezoelectric properties.

For instance, concerning the former disadvantages, ceramic materials are much too hard to lend themselves to ready subdivision and shaping as is required for capacitor and other precision dielectric use. Also shaping prior to firing creates technological problems in that in the course of baking, the material contracts, often substantially. Concerning the latter disadvantage, it is a well known fact that the ceramic crystal structure is altered and that the ceramics lose their remnant piezoelectric properties if raised in temperature above their "Curie point" and must be repolarized on cooling to regain the desired properties. Also the prior art has been much concerned with the problem that the piezoelectric titanates lose a relatively substantial degree of their sensitivity over a period of time. Applicant has thus discovered a method of chemically growing crystals which are inherently polarized, avoiding the necessity of polarization subsequent to firing or repolarization subsequent to heating above the "Curie point." These crystals maintain their sensitivity and polarization because of the chemically induced orientation, are plastic in nature, and have a relatively high transformation point substantially extending their use in higher temperature work.

It is thus a primary object of the invention to provide a new method for growing a polarized titania crystal exhibiting useful piezoelectric and other properties without recourse to the steps of firing the crystal to form a ceramic mass and the subsequent required polarization. It is also an object of the invention to provide a new method of growing the titania crystal to form a plastic polarized mass exhibiting useful piezoelectric and other properties involving a controlled growth of the crystal and a resultant chemical polarization by the use of various growth controlling reducing components. It is also among the objects to provide a novel composition comprising the barium titanate crystal, and polycrystalline titanates which exhibit useful piezoelectric and other properties, and which are in a plastic rather than ceramic state. Other objects of the present invention will become apparent from consideration of the present specification and claims.

In accordance with the above mentioned objects, applicant has found that the metallic titanates can be chemically reduced by an exothermic reaction with certain specific reducing components to yield a plastic polarized composition, usually predominantly barium titanate with a minor proportion of the reduced titanate present. The amounts of reducing components added are sufficient to only partially reduce the titanate crystal, so that the final crystal is probably a mixed titanate-titanite crystal.

The combination of elements comprising the titanate and reduced titanite ions in a crystal structure oriented by the heat of reduction and the presence of reducing ions creates a dipole alignment and thus a predominantly positive or negative polarized crystalline structure, probably tetragonal in shape. Additional agents mentioned below can be utilized to cause an ionic interchange for a given function. Each agent, reducing component, and titanate additive, alone, or in combination, creates a radical crystalline structure and resulting polarity exhibiting specific and particular properties. A plasticizing agent is utilized to convey the reduction, one which in itself physically or chemically enters the crystalline structure.

Generally, barium titanate comprises a major proportion of the starting material ranging from about 30 to 90 percent and preferably from about 60–90%. Additionally, amounts of other well-konwn isomorphic titanates of the perovskite crystal structure may be admixed with the barium titanate as additives influencing the "Curie point." These are group IIa titanates including barium and strontium, as well as active zirconium and lead titanates. Amounts of these additives range from 0–60% and preferably are in the range of 2–15%. Such mixtures of barium titanate with metallic titanates may be grouped and termed "piezo-electric metallic titanates" following the terminology of the Howatt Patent 2,507,253. From a practical standpoint, crystals having a predominant portion of barium titanate exhibit the most useful electrical properties, and thus most of the examples of the present invention disclose a predominant percentage of barium titanate in the starting mixture.

As a preferred conveyor and plasticizing agent for the plastic compositions of the present invention, applicant utilizes a liquid polyalkylene glycol such as Polyethylene Glycol, Nos. 100–200–300–400 (Union Carbide Corporation), in adequate amounts to form a plastic slurry. Slurry as used here is preferably a stiff, viscous mass, elastic in structure, of the consistency of SAE 150 grease. However, thinner or thicker mixtures may be used if it appears advisable for various reasons in the final product.

Operable, but not preferred slurry producers include water and certain acids such as HCl, and $H_2SO_4$, but it is believed that the polyethylene glycol or decomposition products may enter into chemical or physical combination in the final crystal titanates.

The reducing component for activating the above noted piezo-electric titanates is preferably selected from a compound providing lithium ions. It has been found that the addition of a compound providing lithium ions, such as the lithium halides (LiCl, LiBr), $Li_2S$ and LiOH, in the amount of from 1–40%, and preferably from about 5–15%, of the final dry mixture, provides the desired heat of reaction for chemically growing the titania crystal to its polarized state. In some cases, the lithium ion may be provided by lithium titanate which provides a dual function as an isomorphic titanate modifier for barium titanate, as well as an active reducing agent. Applicant has found that among the group IA elements, the lithium ion and particularly the lithium salts best give the preferred reduction and heat of reaction necessary to yield the polarized plastic compositions. It should be noted that LiF and other lithium salts have been proposed as fluxes in the crystallization of $BaTiO_3$. In the present invention, the lithium ion activity enters the polycrystalline titania structure chemically and physically reacting with the titanate, and is not a mere flux. Secondary operable reducing agents also include zinc chloride wherein it is specifically used for ionic interchange for an alkaline battery, although the lithium compounds are greatly preferred.

It is important to note that in preparing the plastic compositions of the present invention that generally the lithium compound is added last to the mixture to provide a heat of reduction which can be utilized by the entire mixture.

The exothermic heat of reduction or heat of reaction produced by the addition of the reducing component is generally in the range of 140–230° F. and is a function of the amount of reducing component utilized. It should be noted that the heat of reduction is below the transformation point of the reduced titanite and or titanate.

In certain of the compositions, to achieve certain specific properties, other additives such as CuCl, CuO, ZnO, and selenous acid are utilized to provide a surplus of predominantly positive or negative crystalline structures. For instance, selenous acid provides negative ions for an unbalance in the total crystal to provide rectifier action and or photo-sensitivity.

It will be noted in the following examples that if the compositions are totaled with respect to the number of electrons in the outer rings of each component that there will be a surplus or a deficit in the total. For instance, a predominance of positive or negative ions in the crystal structure will influence the dipole alignment achieved in the partially reduced titanate crystal, and thus alter the various work functions of the final polycrystalline mass.

In general, the present plastic compositions are produced from the several components by the following method. The unfired $BaTiO_3$ or piezoelectric titanate mixture is thoroughly mixed or blended to a homogeneous mass or powder and sufficient polyethylene glycol is slowly added to form a stiff viscous slurry. Subsequently, the reducing component, preferably in the form of a lithium salt, is added, which causes an exothermic reaction generating a heat of reduction influential in controlling the crystal growth. The reducing component where LiCl is used is believed to partially reduce the titanate, for example to form barium tri-hydrochloride titanite. The level of temperature elevation achieved is primarily dependent upon the amount of lithium ion introduced, but may secondarily be influenced by the introduction of other additives, such as copper halides and oxides, zinc oxide and selenous acid. These latter additives are generally introduced in the original mix with the titanate compound.

After the heat of reaction has subsided, the moist crystalline plastic mass which exhibits unusual moisture retention characteristics, is ready for use in any form desired.

The moist crystal plastic mass performs many of the functions or ferro-electric and piezoelectric properties of the vitrified ceramic mass of the prior art, with the exception that it is in a plastic state. Among these functions are the generation of a voltage with the application of force or pressure, or by the application of heat, the voltage generated being a function of the temperature applied, and the development of voltage and current storage devices, photosensitive elements, non-linear resistors, rectifiers, amplifiers, capacitors, and modulators. One way of placing the plastic mass into a useable condition is to encase the plastic in an hermetically sealed tube.

The following examples are intended to be illustrative of the general method described above.

*Example No. 1*

| | Percent |
|---|---|
| Barium titanate ($BaTiO_3$) | 80 |
| Lithium hydroxide (LiOH) | 5 |
| Lithium chloride (LiCl) | 15 |

These components with the exception of LiCl are thoroughly mixed to a homogeneous mass. Polyethylene Glycol-100 is added to provide a stiff plastic slurry. LiCl is then added and thoroughly mixed to a homogeneous mass. The material at this point will have heat of reduction at about 190° F. The color will remain white. The end result of this composition is an extremely pressure sensitive material which when pressure is applied will generate a voltage or a current depending upon the force supplied. It shows directional characteristics in that varying the angle of the pressure, the polarity of the acceptance of the device will change.

*Example No. 2*

| | Percent |
|---|---|
| Barium titanate ($BaTiO_3$) | 90 |
| Lithium hydroxide (LiOH) | 5 |
| Lithium chloride (LiCl) | 5 |

The LiOH and $BaTiO_3$ are mixed together again to form a homogeneous mass with Polyethylene Glycol-200 being added to derive a thick plastic slurry and the LiCl is added to create a heat of reduction in the neighborhood of 165° F. This material shows the typical ferroelectric hysteresis of $BaTiO_3$ capacitors. It also shows a frequency sensitive notch in the presence of direct capacitor hysteresis which for this purpose can be defined as a 90° lag current and voltage. It has use as a frequency sensitive filter, as a frequency sensitive discriminator, as a pressure sensitive device, as a capacitor with reasonable internal impedance, as a diode the controllable characteristics to be controlled externally, as a storage device which will deliver upwards of 25 micro amperes of current at a 1½ volt level for approximately two hours across a 39 thousand ohm load.

Example No. 3

| | Percent |
|---|---|
| Barium titanate (BaTiO$_3$) | 30 |
| Lead titanate (PbTiO$_3$) | 30 |
| Lithium titanate (LiTiO$_3$) | 30 |
| Lithium chloride (LiCl) | 10 |

The materials, with the exception of LiCl, are mixed. Polyethylene Glycol-300 is added to form a plastic slurry as before. LiCl is then added with a very high heat of reduction being noted. Heat of reduction is in the area of 230° F. A color change takes place which alternately is a beige to a royal blue. This material in its plastic state when equipped with two electrodes, becomes proximity sensitive in that a human being several feet away extending his arms to the device, will cause a voltage and current to be generated in proportion to the distance of the object. It is not heat sensitive nor moisture sensitive.

Example No. 4

| | Percent |
|---|---|
| Barium titanate (BaTiO$_3$) | 80 |
| Lithium titanate (LiTiO$_3$) | 3 |
| Lithium hydroxide (LiOH) | 12 |
| Lithium chloride (LiCl) | 5 |

In compounding this material BaTiO$_3$, LiTiO$_3$, and LiOH are mixed together until they form a homogeneous mass. Glycol (ethylene glycol, c.p.) is slowly added to provide a stiff plastic slurry. LiCl is then added and again the mixture is thoroughly mixed until a homogeneous mass is once again established. The heat of reduction upon the addition of LiCl is generally in the vicinity of 160° to 180° F. This composition yields the following characteristics: A pressure sensitive plastic material which generates a voltage and current upon application of pressure: A storage device possessed of reluctant polarization in that once polarized in one direction, it will accept a charge in the opposite direction and show a tendency to return to the original charge position: A self-rectifying storage device that will accept alternating current and deliver direct current. The efficiency of this device is about 40%. This device exhibits diode action, and slow response time.

Example No 5

| | Percent |
|---|---|
| Barium titanate (BaTiO$_3$) | 88 |
| Lithium titanate (LiTiO$_3$) | 1 |
| Lead titanate (PbTiO$_3$) | 2 |
| Lithium hydroxide (LiOH) | 3 |
| Lithium chloride (LiCl) | 6 |

The ingredients with the exception of LiCl are thoroughly mixed or blended to a homogeneous mass after which the polyethylene glycol is added to produce a stiff plastic slurry. To this slurry the LiCl is then added and thoroughly mixed until once again a firm plastic paste is in evidence. The heat of reduction in this process is again in the order of 165° to 180° F. This composition yields material which, as a two terminal element, will produce a voltage when placed upon two similar electrodes of aluminum, will generate a voltage when pressure is applied, will accept a voltage of either negative or positive polarity and accept a charge the reverse of that which the device holds and will respond in reversal with a time function of less than ¼ micro-second.

This material, when dried, shows pressure sensitive characteristics in that a voltage and current is generated with the addition of pressure. This, to all intent and purpose is a linear function.

Example No. 6

| | Percent |
|---|---|
| Barium titanate (BaTiO$_3$) | 58 |
| Lead titanate (PbTiO$_3$) | 5 |
| Calcium titanate (CaTiO$_3$) | 5 |
| Lithium titanate (LiTiO$_3$) | 2 |
| Lithium hydroxide (LiOH) | 20 |
| Lithium chloride (LiCl) | 10 |

All materials with the exception of LiCl are blended. Polyethylene glycol is added and the heat of reduction at this point will be noted at 150° F. This mixture is then mixed with LiCl to form a stiff plastic slurry and the heat of reduction will be noted at 185° F. to 190° F. with a peculiar odor of hydrogen sulphide being generated. This material has had use in accelerometers, in that voltage output is proportional to pressure. It shows excellent temperature stability, does not show too much of an affinity to moisture and if placed in contact with brass electrodes, will generate a voltage which for all intent and purpose does not end until the material dries and then the voltage is lost.

Example No. 7

| | Percent |
|---|---|
| Barium titanate (BaTiO$_3$) | 90 |
| Lithium hydroxide (LiOH) | 5 |
| Lithium chloride (LiCl) | 3 |
| Zinc chloride (ZnCl$_2$) | 2 |

All materials with the exception of the two chlorides are mixed with polyethylene glycol added to form a slurry. The zinc chloride is then added, at which point the heat of reduction will be in the neighborhood of 200° F. to 210° F. The addition of the LiCl last creates a gas which is obnoxious in odor and creates a color change in that the BaTiO$_3$ turns blue. This material has its use in small reference cells. It can be recharged in a relatively short period of time. It does not possess a given polarity, particularly when the electrode materials are identical. If dissimilar electrodes are used, then a definite polarity is indicated dependent upon the materials. Initial voltages are in the neighborhood of 1.24 volts D.C. The dried material, when placed between two plates of aluminum, creates a voltage which is limited by the area of the dried material and does not exceed a maximum of 1.87 volts.

Example No. 8

| | Percent |
|---|---|
| Barium titanate (BaTiO$_3$) | 80 |
| Lithium hydroxide (LiOH) | 5 |
| Zinc oxide (ZnO) | 5 |
| Lithium chloride (LiCl) | 10 |

The mixture is compounded with the exception of the LiCl to create a homogeneous mass. Polyethylene glycol is then added with a heat of reduction being noted in the area of 140° F. LiCl is then added and the heat of reduction is increased to about 200° F. with no appreciable color change being noted other than traces of a brilliant Paris green throughout the mixture. This mixture, when used with carbon electrodes, becomes a highly efficient primary cell operating throughout the range of a minus 40° F. to plus 250° F. Other uses anticipated and experimentally proven—a storage medium, an instantly recoverable source of constant current, and reference standards (voltage and current).

Other additives, such as lithium sulphide, are effective, as in the following example:

Example No. 9

| | Percent |
|---|---|
| Barium titanate (BaTiO$_3$) | 90 |
| Lithium titanate (LiTiO$_3$) | 1 |
| Lithium hydroxide (LiOH) | 5 |
| Lithium sulphide (Li$_2$S) | 2 |
| Lithium chloride (LiCl) | 2 |

All compounds, with the exception of LiCl, are thoroughly mixed and Polyethylene Glycol-400 is added to create a stiff plastic slurry. A heat of reduction in the area of 140° to 160° F. will be observed with a very pungent gas being generated. The addition of LiCl last to this mixture while the gas is being generated is of utmost importance since the adsorption of the gas is of importance in this composition. The heat of reduction at this point will be from 180° to 200° F. with a highly volatile gas being generated. This gas will explode of its own free will. This material shows photo sensitive reactions in that with the application of light in the order of 5F-candles a voltage and current is generated with a two wire junction of this material. Additionally, this material shows homogeneous characteristics in that the application of varying degrees of light create varying degrees of voltage and current acceptance and in combination generate a saw tooth wave form. This material, when dried, shows characteristics of ferro-electric capacitors in that it will accept a charge and retain it for a reasonable period of time.

Selenous acid is an effective additive, as in the following examples:

*Example No. 10*

| | Percent |
|---|---|
| Barium titanate ($BaTiO_3$) | 87 |
| Selenous acid ($H_2SeO_3$) | 2 |
| Lithium hydroxide (LiOH) | 8 |
| Lithium chloride (LiCl) | 3 |

This material again is compounded to form a homogeneous mass with polyethylene glycol and then LiCl being added. The heat of reduction for the LiCl additive is in the neighborhood of between 180° and 190° F. with the material turning a beige color. This material exhibits characteristics closely allied to a non-linear resistor in that it is voltage and current sensitive and is not temperature dependent for its action. Additionally, this material will accept a charge that is bidirectional. It will retain that charge for a considerable period of time and additionally presents the capabilities in conjunction with the proper lead resistor of wave shape; i.e., triangular, square, and so forth. This material, when placed in contact with copper plates generates a voltage that is proportional to the diameter of cross section areas of the copper electrodes, to a given point. In no case will the voltage exceed 2.75 volts. With the addition of brass electrodes, this material becomes a voltaic cell in that it generates a current and a voltage without any pre-charges or energizing in itself.

By adding selenous acid last, even subsequent to LiCl, the properties can be radically altered, as in the following two examples:

*Example No. 11*

| | Percent |
|---|---|
| Barium titanate ($BaTiO_3$) | 80 |
| Lithium hydroxide (LiOH) | 10 |
| Lithium chloride (LiCl) | 5 |
| Selenous acid ($H_2SeO_3$) | 5 |

$BaTiO_3$ and LiOH are combined to form a homogeneous mass. Polypropylene glycol is then added to form a stiff slurry. Slight heat of reduction will be noted at this point. LiCl is then added to the aforementioned mixture and the heat of reduction at this point will be above 160° to 180° F. After the addition of LiCl the selenous acid is added. The temperature should increase by 20°. This mixture is primarily used as a pressure sensitive mixture generating a voltage which is variable in accord with the applied pressure. The average voltage and current found at the terminals of this device is not in excess of a volt and a half with a current of 500 microamperes maximum. It does possess storage characteristics and has several rectifier characteristics.

*Example No. 12*

| | Percent |
|---|---|
| Barium titanate ($BaTiO_3$) | 90 |
| Lithium chloride (LiCl) | 10 |
| plus selenous acid ($H_2SeO_3$) | |

The $BaTiO_3$ and polyethylene glycol are mixed to form a stiff plastic mass. The LiCl is then added to this plastic mass creating a heat of reduction of 180° F. This mass is thoroughly mixed. To this mixture is added 10% selenous acid. This material must be thoroughly mixed. Two terminal devices in hermetically sealed cans effectively show half wave rectification. Additionally, it is directional in operation. It is not affected by heat to 200° C. nor by cooling to minus 50° centigrade. It shows promise as being developed into a high current rectifier. Its breakdown voltage is presently 30 volts for a 25 gram mass.

In this and the prior example, the lithium chloride is added prior to the selenous acid, but still provides the necessary reduction and heat of reduction to effect crystal growth. The subsequent addition of selenous acid is during the heat of reduction and the selenium ion enters into the crystal structure. However, adding the selenous acid after the LiCl does appear to affect the participation of the selenium ion in the crystal growth and the resultant properties obtained.

Selenous acid and copper chloride can also be added prior to LiCl to affect the electrical properties, as in the following examples:

*Example No. 13*

| | Percent |
|---|---|
| Barium titanate ($BaTiO_3$) | 80 |
| Lithium hydroxide (LiOH) | 10 |
| Lithium chloride (LiCl) | 5 |
| Selenous acid ($H_2SeO_3$) | 3 |
| Copper chloride (CuCl) | 2 |

The LiOH and $BaTiO_3$ are combined with adequate polyethylene glycol being added to create a plastic mass. The copper chloride is then added at which point the heat of reduction is in the neighborhood of 150° F. The selenous acid is then added at which the heat of reduction becomes 180° F. Some change in color may take place creating a brilliant Prussian blue. LiCl is then added and as the heat of reduction increases to about 220° F. the color will change to a brilliant canary yellow, with a very acrid vapor being given off. This mixture exhibits a photo sensitive response. If an object is moved near a mixture, the mixture generates a voltage and current. The closer the proximity of the object to the mixture, the greater the current. If the object is gradually withdrawn, a decrease in current and voltage will be noted. This mixture possesses storage characteristics plus lack of polarity.

*Example No. 14*

| | Percent |
|---|---|
| Barium titanate ($BaTiO_3$) | 80 |
| Lithium hydroxide (LiOH) | 10 |
| Lithium chloride (LiCl) | 5 |
| Selenous acid ($H_2SeO_3$) | 3 |
| Copper oxide ($Cu_3O_2$) | 2 |

This mixture when mixed in accord with the preceding mixture exhibits much the same results and color changes. However, it shows a greater efficiency as a rectifier with an estimated efficiency of 95% and an experimentally proven efficiency of 58%. This mixture exhibits storage characteristics plus instantaneous reversal of polarity.

*Example No. 15*

| | Percent |
|---|---|
| Barium titanate ($BaTiO_3$) | 58 |
| Lithium chloride (LiCl) | 12 |
| Lithium bromide (LiBr) | 3 |
| Lithium Hydroxide (LiOH) | 20 |
| Copper oxide (CuO) | 5 |
| Selenous acid ($H_2SeO_3$) | 2 |

All materials with the exception of the LiCl are thoroughly mixed with glycol being added to form a stiff slurry. The addition of the LiCl creates considerable heat and creates a color change bordering on the violent blue-green. This mixture when hermetically sealed creates a capacitor which when used in transistor circuitry permits higher efficiency with less current drain than existing capacitive devices. Its hysteresis when taken at 100 kc. shows an ellipse with a complete phase reversal being evidenced at 5 megacycles. Additionally, this mixture can be used as a storage device with its charge being held constant throughout a D.C. bias of one micro ampere.

*Example No. 16*

|  | Percent |
|---|---|
| Barium titanate ($BaTiO_3$) | 85 |
| Lead titanate ($PbTiO_3$) | 5 |
| Calcium titanate ($CaTiO_3$) | 5 |
| Lithium titanate ($LiTiO_3$) | 5 |

In this composition all components thereto are blended simultaneously for a homogeneous mass with glycol added to make a thick plastic slurry again. This material, with glycol additive, generates heat of reduction in the area of 140° F. and possesses the following capabilities:

It is an efficient thermionic generator in that the application of heat will generate both a voltage and current. It possesses favorable storage characteristics for use in computor memory devices. It possesses instantaneous reversal of polarity characteristics and it too is capable of accepting alternating current at one terminal and delivering direct current at the other terminal.

The lithium titanate here provides the dual function as an isomorphic modifier for barium titanate, as well as an active reducing agent.

Having thus described my invention, I claim:

1. An unfired polycrystalline and polarized plastic mass exhibiting piezoelectric and ferroelectric properties consisting essentially of the crystalline reaction product of a homogeneous plastic slurry, said slurry consisting essentially of at least 60% of piezoelectric metallic titanate selected from the group consisting of alkaline earth titanates, zirconium titanate, lead titanate, and combinations thereof of the Perovskite structure, from 1–40% of an exothermic inorganic chemical component containing lithium ions selected from the group consisting of lithium halides, $Li_2S$ and LiOH and a liquid polyalkylene glycol sufficient to form a stiff viscous slurry.

2. A plastic mass according to claim 1 wherein said liquid polyalkylene glycol is polyethylene glycol.

3. A plastic mass according to claim 1 wherein the said component containing lithium ions is added last to the slurry to produce a temperature elevation of the slurry within the range of about 140° F.–230° F.

4. A plastic mass according to claim 1 wherein the lithium ion component additionally contains zinc ions.

5. A plastic mass according to claim 1 wherein said metallic titanate is predominantly $BaTiO_3$.

6. The method of producing an unfired piezoelectric titanate plastic mass which comprises (a) blending an unfired perovskite piezoelectric metallic titanate selected from the group consisting of alkaline earth titanates, zirconium titanate, lead titanate, and combinations thereof with a liquid polyalkylene glycol sufficient to yield a stiff, viscous slurry and (b) polarizing and partially reducing said titanate by subsequently adding to said slurry from 1 to 67% of the amount of metallic titanate an inorganic chemical component containing lithium ions selected from the group consisting of lithium halides, $Li_2S$ and LiOH to elevate the temperature of the slurry within the range of about 140°–230° F.

7. A method according to claim 6 wherein the metallic titanate is predominantly $BaTiO_3$ and includes at least one additional titanate modifier selected from the group consisting of $Li_2TiO_3$, $PbTiO_3$, $CaTiO_3$, $SrTiO_3$, and $ZrTiO_3$.

8. A method according to claim 6 wherein the polyalkylene glycol is polyethylene glycol.

9. A method according to claim 6 wherein the lithium ion component is present in amount of about 5–15% based on the dry weight of the plastic mass.

10. A method according to claim 6 wherein at least one ionic unbalance promoter selected from the group consisting of $H_2SeO_3$, ZnO, CuCl, and CuO is added to said slurry.

References Cited in the file of this patent

UNITED STATES PATENTS

| 2,520,376 | Roup et al. | Aug. 29, 1950 |
| 2,598,707 | Matthias | June 3, 1952 |
| 2,602,753 | Woodcock et al. | July 8, 1952 |
| 2,750,657 | Herbert et al. | June 19, 1956 |
| 2,803,519 | Karan | Aug. 20, 1957 |

OTHER REFERENCES

"Synthetic Organic Chemicals," pub. Carbide and Carbon Chem. Corp., N.Y., 12th ed., 1945, pages 19–23.

Fang et al.: "Domain Conversion of Multidomain Barium Titanate Single Crystal," Physical Review, vol. 108, No. 2, October 1957, pages 242–243.